US008197331B2

(12) United States Patent
Pacey et al.

(10) Patent No.: US 8,197,331 B2
(45) Date of Patent: Jun. 12, 2012

(54) GAMING SYSTEM HAVING GRAPHICAL INDICATORS OF COMMUNITY BONUS AWARDS

(75) Inventors: Larry J. Pacey, Chicago, IL (US); Daniel P. Louie, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 161 days.

(21) Appl. No.: 12/741,548

(22) PCT Filed: Nov. 3, 2008

(86) PCT No.: PCT/US2008/012422

§ 371 (c)(1),
(2), (4) Date: May 5, 2010

(87) PCT Pub. No.: WO2009/061383

PCT Pub. Date: May 14, 2009

(65) Prior Publication Data

US 2010/0248812 A1 Sep. 30, 2010

Related U.S. Application Data

(60) Provisional application No. 61/002,353, filed on Nov. 8, 2007.

(51) Int. Cl.
*A63F 13/00* (2006.01)

(52) U.S. Cl. ................ 463/20; 463/16; 463/17; 463/18; 463/19; 463/21; 463/40; 463/41; 463/42

(58) Field of Classification Search .............. 463/16–21, 463/40–42
See application file for complete search history.

(56) References Cited

U.S. PATENT DOCUMENTS

| | | | | |
|---|---|---|---|---|
| 6,364,314 | B1 | 4/2002 | Canterbury | 273/274 |
| 7,662,040 | B2 | 2/2010 | Englman et al. | 463/42 |
| 2004/0053662 | A1* | 3/2004 | Pacey | 463/16 |
| 2004/0127290 | A1* | 7/2004 | Walker et al. | 463/42 |
| 2005/0096114 | A1* | 5/2005 | Cannon et al. | 463/16 |
| 2006/0073897 | A1 | 4/2006 | Englman et al. | 463/20 |
| 2006/0094495 | A1 | 5/2006 | Gelber et al. | 463/20 |

(Continued)

FOREIGN PATENT DOCUMENTS

WO WO 2008/133850 A1 11/2008

(Continued)

OTHER PUBLICATIONS

PCT International Search Report for International Application No. PCT/US2008/012422 mailed Jan. 5, 2009 (1 page).

(Continued)

*Primary Examiner* — Ronald Laneau
*Assistant Examiner* — Justin Myhr
(74) *Attorney, Agent, or Firm* — Nixon Peabody LLP

(57) ABSTRACT

A gaming system comprises a plurality of gaming machines adapted to display at least one primary wagering game thereon. At least one community display displays a community event, such as a big event bonus game. A controller communications with the community display and the plurality of gaming machines. The controller selects one or more gaming machines from the plurality of gaming machines to participate in the community event. The controller provides a graphical indicator of a bonus game enhancement, such as a bonus-game multiplier, on the plurality of gaming machines for enhancing an outcome of the community event. The graphical indicator is representative of, and distinct from an actual award value.

21 Claims, 7 Drawing Sheets

U.S. PATENT DOCUMENTS

| | | | | |
|---|---|---|---|---|
| 2006/0111169 | A1 | 5/2006 | Hornik et al. | 463/16 |
| 2006/0111170 | A1 | 5/2006 | Hornik et al. | 463/16 |
| 2006/0135243 | A1 | 6/2006 | Englman et al. | 463/16 |
| 2006/0135254 | A1 | 6/2006 | Thomas | 463/25 |
| 2006/0160625 | A1 | 7/2006 | Englman et al. | 463/42 |
| 2006/0178202 | A1 | 8/2006 | Hughes et al. | 463/20 |
| 2006/0183536 | A1 | 8/2006 | Gagner et al. | 463/26 |
| 2007/0129147 | A1 | 6/2007 | Gagner | 463/42 |
| 2008/0045341 | A1 | 2/2008 | Englman | 463/42 |
| 2009/0011822 | A1 | 1/2009 | Englman et al. | 463/25 |
| 2009/0011823 | A1 | 1/2009 | Englman et al. | 463/25 |
| 2009/0011824 | A1 | 1/2009 | Englman et al. | 463/42 |
| 2009/0011827 | A1 | 1/2009 | Englman et al. | 463/26 |
| 2009/0042641 | A1 | 2/2009 | Anderson et al. | 463/25 |
| 2009/0093298 | A1 | 4/2009 | Michel | 463/20 |
| 2009/0117969 | A1 | 5/2009 | Englman | 463/20 |
| 2009/0117974 | A1 | 5/2009 | Hornik | 463/20 |
| 2009/0176556 | A1 | 7/2009 | Gagner et al. | 463/25 |
| 2009/0253483 | A1 | 10/2009 | Pacey et al. | 463/25 |
| 2010/0041464 | A1 | 2/2010 | Arezina et al. | 463/22 |
| 2010/0056261 | A1 | 3/2010 | Englman et al. | 463/23 |
| 2010/0120522 | A1 | 5/2010 | Englman et al. | 463/26 |
| 2010/0222123 | A1 | 9/2010 | Hornik | 463/16 |
| 2010/0267439 | A1 | 10/2010 | Englman et al. | 463/42 |
| 2010/0304843 | A1 | 12/2010 | Aoki et al. | 463/25 |
| 2011/0009187 | A1 | 1/2011 | Mastropietro | 463/25 |
| 2011/0034239 | A1 | 2/2011 | Collette et al. | 463/26 |
| 2011/0045898 | A1 | 2/2011 | Anderson | 463/25 |

FOREIGN PATENT DOCUMENTS

| | | | |
|---|---|---|---|
| WO | WO 2008/143790 | A2 | 11/2008 |
| WO | WO 2009/051637 | A1 | 4/2009 |
| WO | WO 2009/052164 | A1 | 4/2009 |
| WO | WO 2009/086489 | A1 | 7/2009 |
| WO | WO 2010/002794 | A1 | 1/2010 |
| WO | WO 2010/054061 | A1 | 5/2010 |

OTHER PUBLICATIONS

PCT International Written Opinion for International Application No. PCT/US2008/012422 mailed Jan. 5, 2009 (5 pages).

* cited by examiner

GAMING SYSTEM HAVING GRAPHICAL INDICATORS OF COMMUNITY BONUS AWARDS

CROSS REFERENCE TO RELATED APPLICATIONS

This application is a U.S. national stage of International Application No. PCT/US2008/012422, titled "Gaming System Having Graphical Indicators Of Community Bonus Awards" filed Nov. 3, 2008, which claims priority to U.S. Provisional Patent Application Ser. No. 61/002,353, titled "Gaming System Having Graphical Indicators Of Community Bonus Awards" filed on Nov. 8, 2007, each of which is incorporated herein in its entirety.

COPYRIGHT

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a community game with graphical indicators of community award multipliers.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Another bonus game concept that has been advantageously employed is the communal wagering game, or "Big Event", concept. The communal wagering game is displayed on a communal display which is connected to a number of wagering gaming machines. Based on various aspects of the play of the wagering gaming machines, for example, each gaming machine's recent wager history within a predetermined time period, two or more of the gaming machines are selected to participate in the communal wagering game. One such communal wagering game is disclosed in commonly assigned, U.S. patent application Ser. No. 11/354,522, which is incorporated herein by reference in its entirety. Although the communal wagering game increases the excitement level of the game play experience, increases in the anticipation and excitement generated by the communal wagering game are desired. Further, displaying communal awards in the communal wagering game as they are accrued in an exciting method is desired to further increase anticipation by the players.

SUMMARY OF THE INVENTION

According to one aspect of the present invention, a gaming system is provided comprising a plurality of gaming machines adapted to display at least one primary wagering game thereon, at least one community display for displaying a community event thereon; and at least one controller in communication with the at least one community display and the plurality of gaming machines. The controller selects one or more gaming machines from the plurality of gaming machines to participate in the community event and provides a graphical indicator of a bonus game enhancement, which may be a bonus-game multiplier, on the plurality of gaming machines for enhancing an outcome of the community event. The graphical indicator is distinct from an actual award value for the community event.

According to another aspect of the invention, a method for conducting a communal wagering game on a plurality of gaming machines comprises the steps of: providing a community display for displaying a community event thereon; selecting two or more gaming machines from the plurality of gaming machines to participate in the community event; and providing a graphical indicator of a bonus game enhancement for enhancing an outcome of the community event. The graphical indicator is distinct from an actual award value.

According to yet another aspect of the invention, a method for conducting a communal wagering game on a plurality of gaming machines comprising the steps of: providing a community display for displaying a community event thereon; selecting two or more gaming machines from the plurality of gaming machines to participate in the community event; providing a graphical indicator of a community-event award on the community display comprised of one or more randomly dispersed award icons; and providing a graphical indicator of a bonus-game multiplier for enhancing the community-event award, the graphical indicator of the bonus-game multiplier visually related to one or more the award icons.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
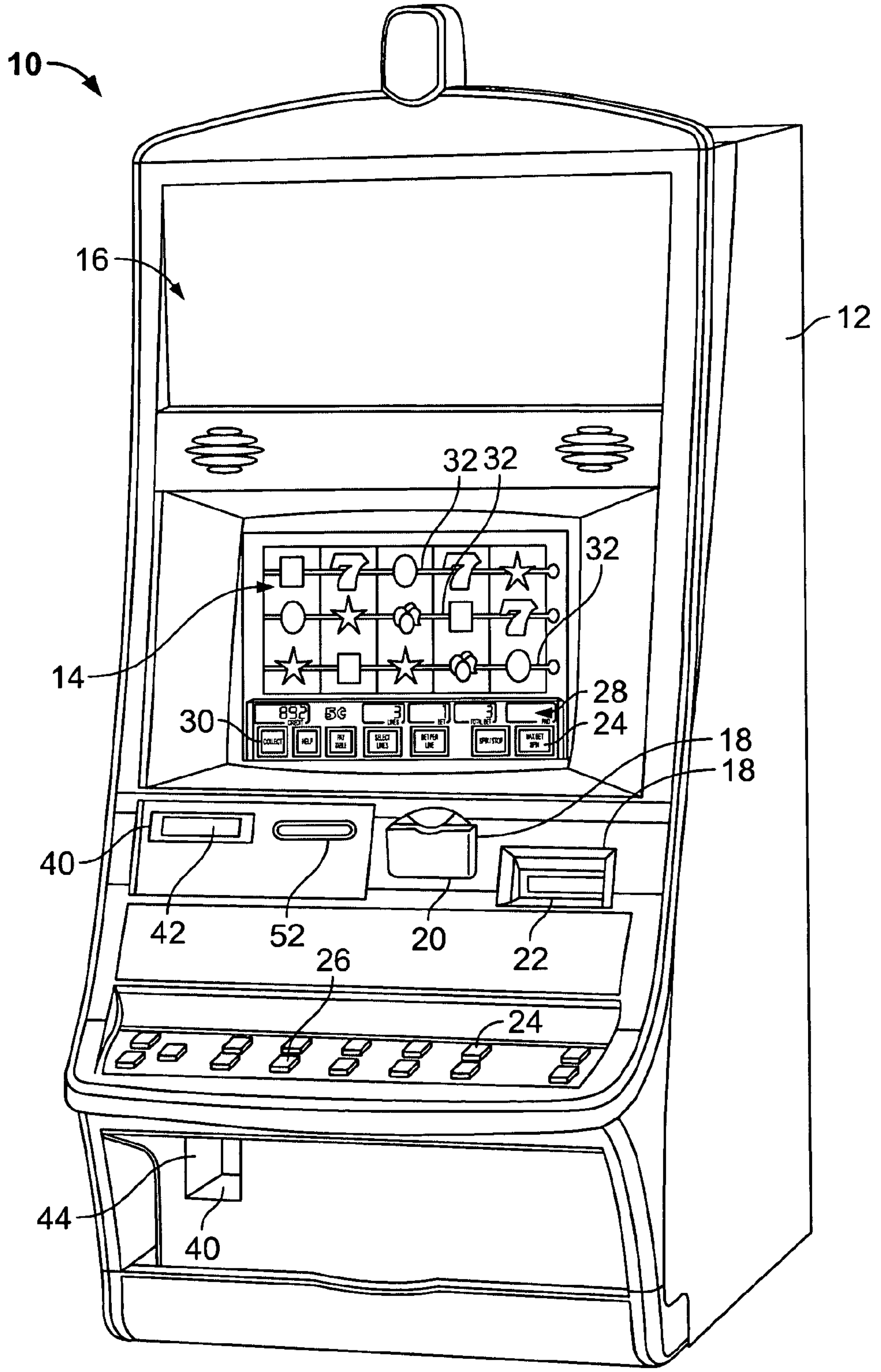
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12 or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an “upright” version in which the primary display 14 is oriented vertically relative to the player. Alternatively, the gaming machine may be a “slant-top” version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a free spin bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
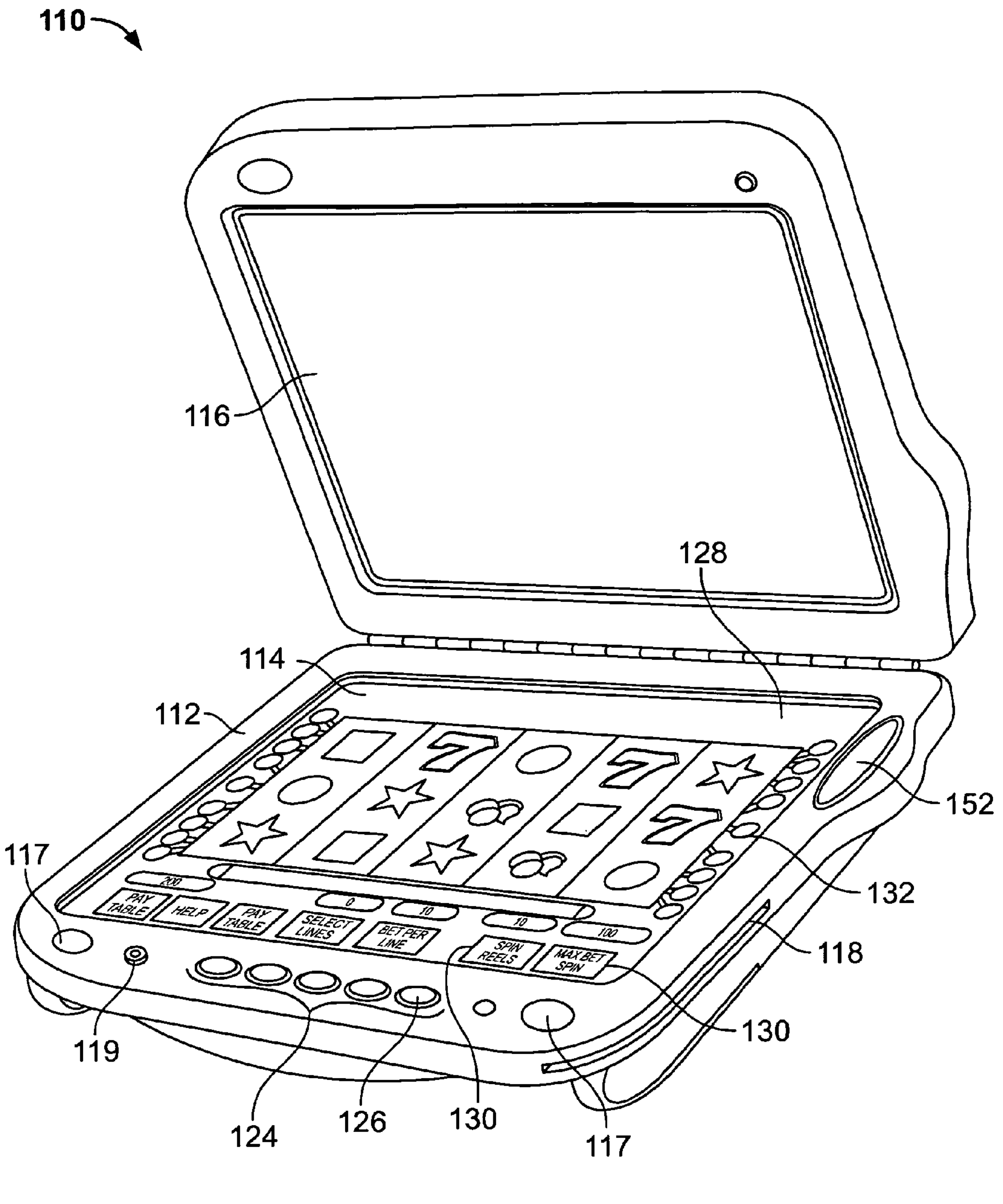
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a free spin bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
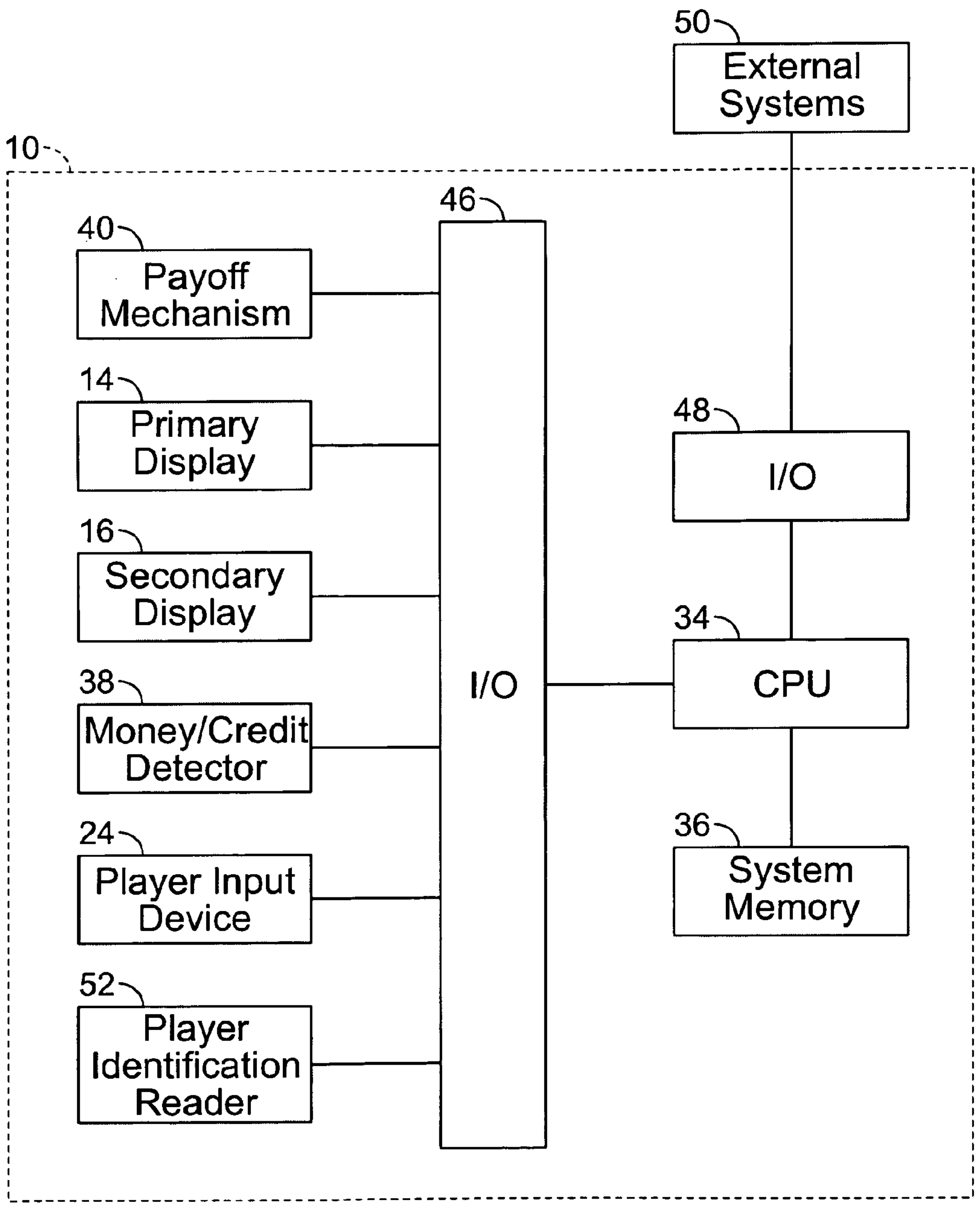
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, both basic games and bonus games, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12, such as in a communal server, and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

While the gaming machine 10 of FIGS. 1*a*, 1*b* and 2 has been described with respect to providing a player a basic and bonus game, the gaming machine may be connected to a community wagering game to which several gaming machines are linked. This gaming network and, in particular, a dynamic pictorial representation feature of the bonus game will be described below with reference to FIGS. 3-7.

Figure 3:
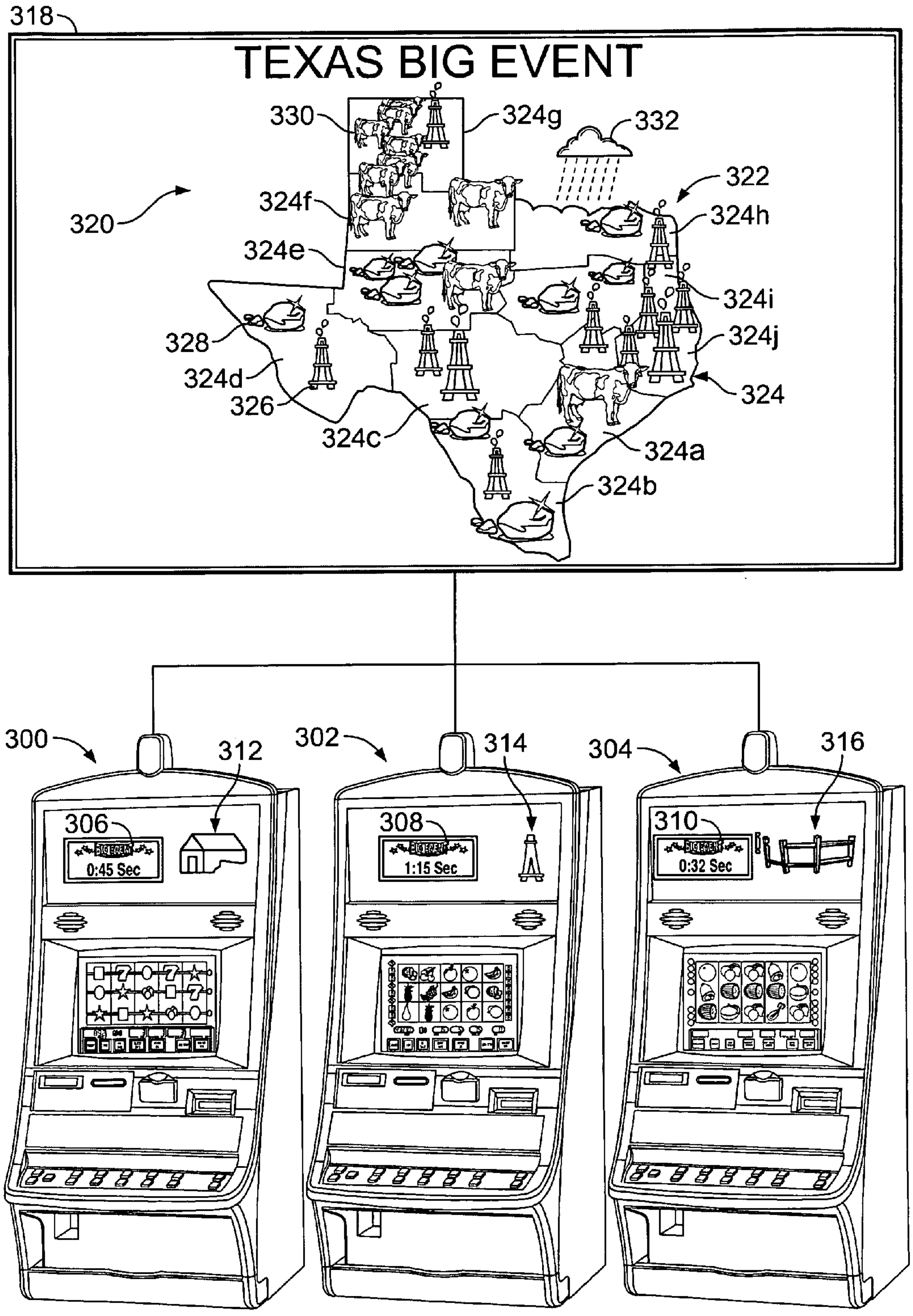
FIG. 3 is a is perspective view of three free standing gaming machines connected to a community display.

Turning now to FIG. 3, gaming machines 300, 302, and 304 are operable to play a communal game entitled TEXAS BIG EVENT™ having a Texas theme. It will be appreciated that the gaming machines 300, 302, and 304 are shown as the upright version of the gaming machine 10 but may be any combination of the gaming machine 10 and the gaming machine 110. Each of the respective gaming machines 300, 302, and 304 may display a communal event timer, or BIG EVENT timer, 306, 308, and 310 and a pictorial representation of a visual bonus game, or Big Event, multiplier 312, 314, and 316. A community display 318 displays a communal bonus game 320 illustrated for exemplary purposes as the TEXAS BIG EVENT™ game. Communal awards in the communal wagering game are displayed on the community display 318 as the awards are accrued in an exciting, animated graphical manner which further increases the players' anticipation of winning the communal award.

The communal bonus game 320 comprises a graphical indicator 322 of a community award, or community-award representation, which in this instance consists generally of the State of Texas 324 divided into regions 324*a*-324*j*. Each of the regions 324*a*-324*j* may provide a pictorial representation of a community bonus credits or awards. The community bonus award amount for each region 324*a*-324*j* is depicted by award icons placed on each of the regions 324*a*-324*j*. For this example, the award icons are shown as an oil well 326, a gold nugget 328, and a cow 330. It should be appreciated that other award icons may be advantageously used in the invention and that these icons are shown for exemplary purposes only. The number, location, and type of award icons placed on, moved on, or removed from the community-award representation 322 may be random or may be determined in a progressive manner (e.g., more award icons appear as the coin-in for one or more gaming machines increases). The graphical indicator 322 of the community award, including the one or more award icons, comprises a visual depiction of non-numerical objects which are representative of, and distinct from, actual award amounts. Although there may be a thematic relationship between the graphical indicator 322 and the plurality of symbols of the array (such as a cowboy theme with the graphical indicator 322 including a ranch and the symbols being various versions of cattle, horses, and pigs), the graphical indicator 322 are representative of actual award amounts and are distinct from the plurality of symbols.

Dynamic action icons, such as storm cloud 332, may also be included in the community-award representation 322. As will be discussed below, the dynamic action icons are interactive with the various award icons 326, 328, and 330. For example, the storm cloud 332 may create a visual storm which clears a portion of the community award representation 322 to create space for additional award icons, such as more gold nuggets 328, or which causes the cattle 330 to move, or herd, to another region. The award icons 326, 328, and 330 may be animated. For example, oil may periodically gush from the oil well 326. Consequently, the location, quantity, value, and type of the award icons 326, 328, and 330 may be continually, or periodically, changing during the playing of a basic game or the communal bonus game 320. While playing the basic game, for example, a player has a heightened sense of excitement viewing and anticipating the communal wagering game 320 as the award icons 326, 328, and 330 are changing, being removed, or being added to the community display 318.

Figure 4:
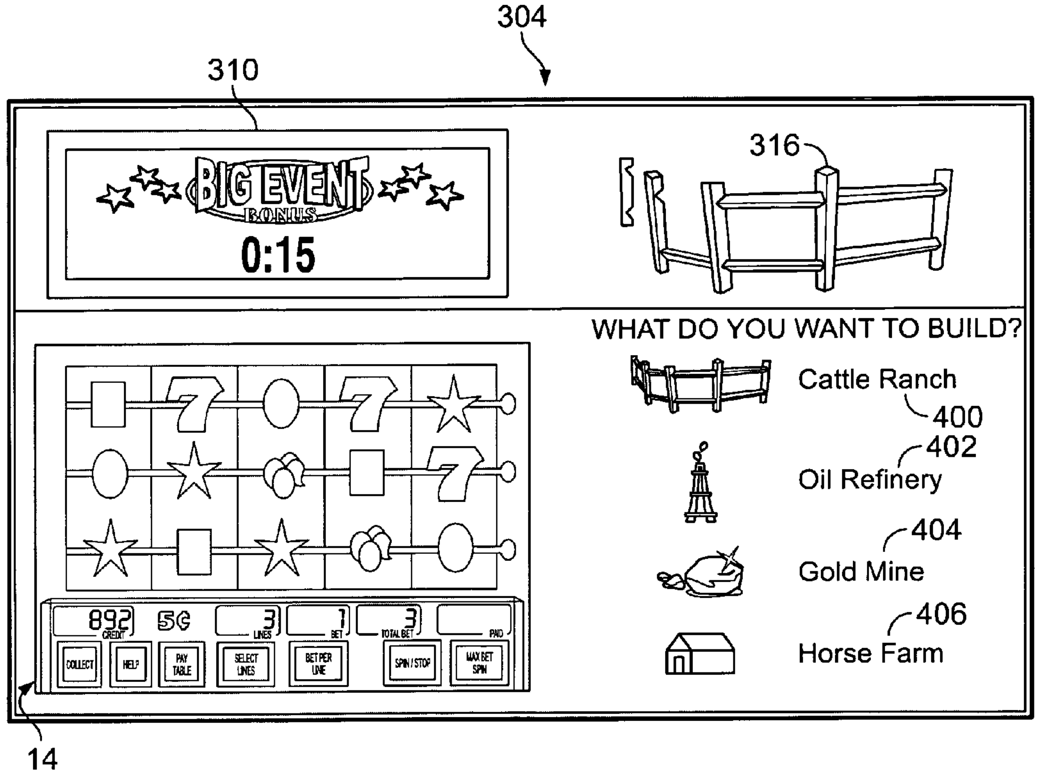
FIG. 4 is a screen shot of a primary display of a gaming system displaying a primary wagering game and a selection of graphical indicators for bonus-game multipliers for a communal wagering game.
Figure 5:
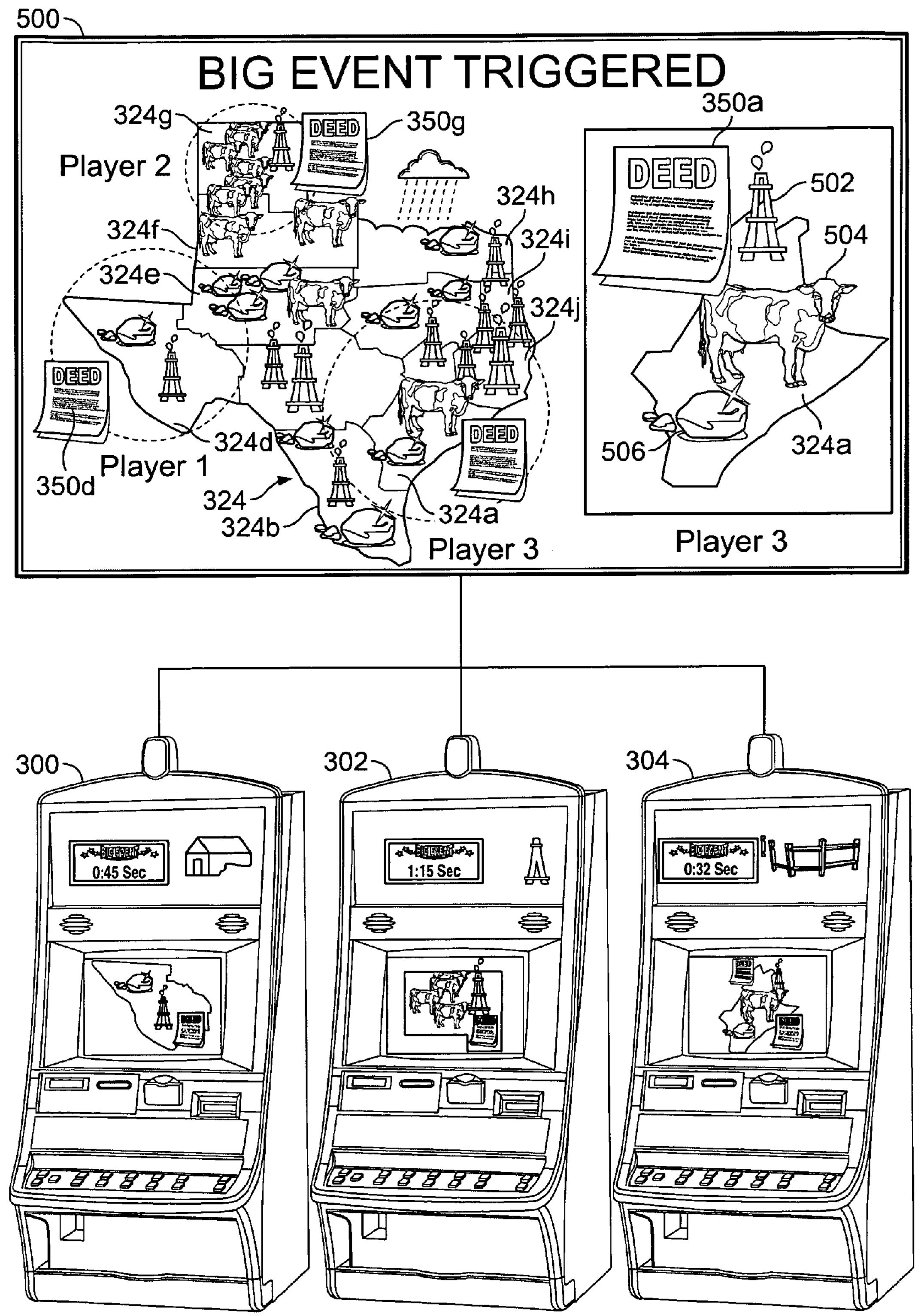
FIG. 5 is a perspective view of the gaming machines and community display shown in FIG. 3 having a communal wagering game initiated on the community display.

Turning now to FIGS. 4 and 5, a general description of the communal bonus game 320 will be provided. The communal bonus game 320 is activated in response to any number of outcomes on one or more of the gaming machines 300, 302, and 304. For example, the communal bonus game 320 may be activated upon any of the gaming machines 300, 302, and 304 hitting a predetermined outcome. Alternatively, the communal bonus game 320 may be activated in a random manner disassociated with the play of the gaming machines 300, 302, and 304. All gaming machines 300, 302, and 304 which are qualified for the communal bonus game 320 are entered in the communal bonus game 320. It should be apparent that one or any number of the gaming machines 300, 302, and 304 may participate in the communal bonus game 320.

When the communal bonus game 320 is activated, each of the participating gaming machines 300, 302, and 304 is requested to select one or more of bonus-game enhancements, modifiers, or multipliers, to visually display on the community display 318. The bonus-game multipliers are non-numerical graphical, pictorial, or visual indicators, or representations of multipliers for the gaming machines 300, 302, and 304. In the example shown in FIG. 4, a player of the gaming machine 304 is asked to select a bonus-game multiplier from one or more of a cattle ranch 400, an oil refinery 402, a gold mine 404, or a horse farm 406. It should be understood that any number of bonus-game multipliers or combinations thereof may be used, such as railroad stations, wagons, factories, and the like. In this instance, the player has selected the cattle ranch 400. The bonus-game multiplier 316 for this player is then visually represented during the duration of the BIG EVENT timer 310 as the cattle ranch 400 being constructed, such as by adding boards to a fence, as the value of the bonus-game multiplier 316 increases. Similarly, if the player would have selected the horse farm 406 to build, portions of a barn may be added to the bonus-game multiplier 316 as the value of the bonus-game multiplier 316 increases. Other visual aspects of the selected bonus-game multiplier 316 may be modified or changed to indicate the increase or decrease in the multiplier. The horse farm 406 may, for example, become a larger as the multiplier increases.

The bonus-game multipliers 400, 402, 404 and 406 may be visually related to the award icons 326, 328 and 330 dispersed throughout the community award graphical indicator 322. In the example shown herein, the cattle ranch bonus-game multiplier 400 is visually related to the cow award icon 330. Further, the oil refinery bonus-game multiplier 402 is visually related to the oil-well award icon 326. Any number of related graphical indicators may be advantageously used.

As the BIG EVENT timer 310 is decremented, the player plays the gaming machine and the outcome of each spin is shown in the display 14. Based on the outcome of the spins, the amount the player bets on each spin, and the number of spins that the player accomplishes before the BIG EVENT timer 310 runs out, the value of the bonus-game multiplier 316 is increased. As the value of the bonus-game multiplier 316 is increased, the graphical indicator of the bonus-game multiplier 316 is gradually completed. The bonus-game multiplier 316 for the player is finally determined when the BIG EVENT timer 310 has timed out.

Turning now to FIG. 5, gaming machines 300, 302, and 304 are shown connected to a community display 500 displaying the State of Texas 324. The community display 500 may be a display separately or remotely located from the gaming machines 300, 302, and 304 or the community display 500 may be a portion of the primary display 14 on the gaming machines 300, 302, and 304. The community display 500 may be any visual display which provides a graphical indicator of at least a portion of the community event or communal bonus game.

Upon the timing out of the BIG EVENT timer 310, one or more of the regions 324*a*-324*j* are assigned to the participating gaming machines 300, 302, and 304. For purposes of illustration only, FIG. 5 shows Player 1 (playing the gaming machine 300) being randomly assigned the region 324*d*, Player 2 (playing the gaming machine 302) being randomly assigned the region 324*g* and Player 3 (playing the gaming machine 304) being randomly assigned the region 324*a*. Each of these assignments is visually represented by respective deeds 350*d*, 350*g*, and 350*a*. Alternatively, one or more of the regions 324*a*-324*j* may be assigned to the participating gaming machines 300, 302, and 304 prior to, or during, the decrementing of the BIG EVENT timer 310.

To indicate increasing or decreasing value of the bonus-game multiplier for each of the gaming machines 300, 302, and 304, the associated region 324*a*-324*j* may grow or shrink accordingly. The deeds 350*d*, 350*g*, and 350*a* may be further uniquely identified by color and sounds. Further, the deeds 350*d*, 350*g*, and 350*a* may be blinking or moving when assigned.

Figure 6:
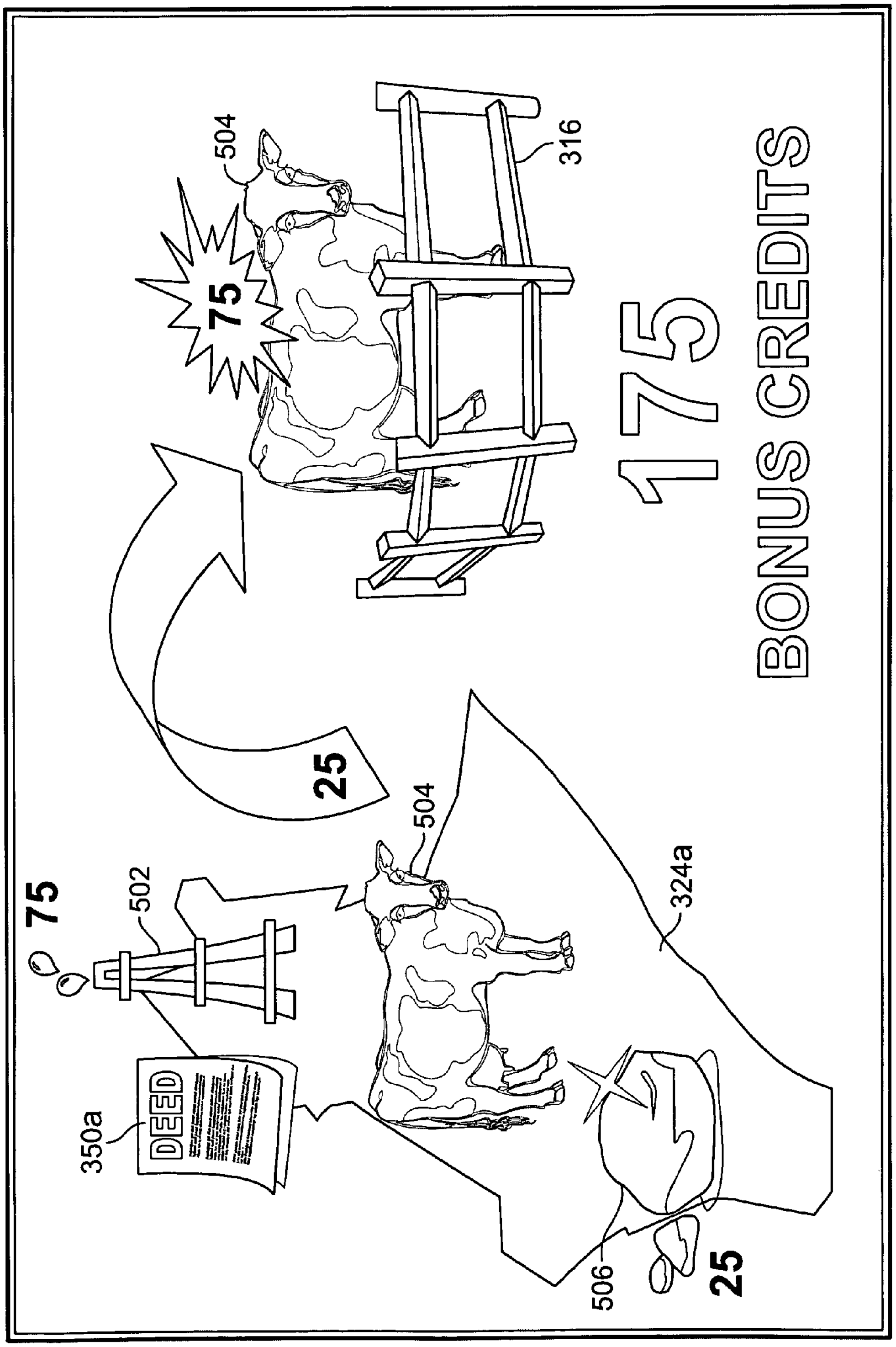
FIG. 6 is an illustration of a screen shot of the community display displaying a compilation of a total community bonus award.

Referring now to FIG. 6, in this exemplary illustration, Player 3 has been awarded the region 324*a* which, when awarded, contains award icons comprising an oil well 502, a cow 504, and a gold nugget 506. Although any credit values may be used, the oil well 502 is shown as 75 credits, the cow 504 is shown as 25 credits, and the gold nugget 506 is shown as 25 credits. Player 3 receives a credit award for each of the icons 502, 504, and 506 in the region 324*a*. In addition, since Player 3 had selected the cattle ranch 400 to build, Player 3 receives extra credits for each visually related award icon, or in this case the cow 504, in region 324*a*. The status of the construction of the selected cattle ranch 400 when the BIG EVENT timer 310 is completely decremented may determine the bonus-game multiplier for Player 3. For example, a maximum multiplier may be a ten-times multiplier, which is provided to Player 3 if the cattle ranch 400, is completely built. If only half of the cattle ranch 400 is constructed, Player 3 may receive a five-times multiplier. In the example shown in FIG. 3, Player 3 earned a three-times multiplier, represented by fence 316 and therefore, earns 75 credits for the cow 504. The total bonus-credit award for Player 3 is therefore 175 credits.

The award icons 502, 504, and 506 may have value ranges instead of set values. For example, the credit award for the oil well 502 may range from 5-5000 credits depending upon the size of the gusher from any specific oil well. Additionally, any number of events may trigger addition awards when calculating the total bonus credit for a particular player. For example, an extra region may be awarded to a player, a stampede of cattle may occur into the region or an alien icon may descend on the region and modify one or more award icons to double or triple the icons normal value. A player may select one or more bonus-game multipliers, which are shown as the cattle ranch 400, the oil refinery 402, the gold mine 404, and the horse farm 406. Alternatively, a player may be randomly assigned one or more of the bonus-game multipliers by the controller 34 or server.

In some embodiments, the value associated with the various visual elements varies based on the bonus-game multiplier selected by or for the player. For example, a player with a gold mine 404 bonus-game multiplier may be awarded 75 credits for each gold nugget 506, 50 credits for each cow 504, and 25 credits for each oil well 502 while a player with a cattle ranch 400 for a bonus-game multiplier may receive 75 credits for each cow 504, 50 credits for each oil well 502, and 25 credits for each gold nugget 506. Thus, there is a reduced potential for a player to perceive one of the bonus-game multipliers as being more or less valuable than another of the bonus-game multipliers from game to game.

The bonus-game multipliers may include various unique icons, such as "one-time" special bonus multipliers which may be periodically assigned or available for selection. The bonus-game multipliers may be dynamically modified based on non-gameplay, communal, or server, events, such as a communal server randomly awarding a player an extra bonus game modifier for a five minute time period or until the extra bonus game modifier is used in a communal wagering game event. A player may further be able to save the status of one or more of the bonus-game multipliers. The player then may later log on to the gaming network via the player-accessible value-input device 118, or any other log in device which uniquely identifies the player, and begin the communal wagering game with the one or more bonus-game multipliers in the state they were in when the player terminated the previous game session. The processor 34, or other similar device, may store the status of the one or more bonus-game multipliers between the gaming sessions of the player.

A number of different theme types may be advantageously employed. For example, an African plains theme may be employed where antelope, rhinos, big cats, and elephants are used as icons with related bonus-game multipliers. A medieval setting could be used with castles, dragons, knights, princesses, and the like. Each of these theme types provide for exciting and animated graphical indication of communal awards in the communal wagering game as the communal awards are accrued by the players which further increases their anticipation of winning the communal award.

Each of these embodiments and obvious variations thereof is contemplated as falling within the spirit and scope of the claimed invention, which is set forth in the following claims.

What is claimed is:

1. A gaming system comprising:

a plurality of gaming machines adapted to display at least one primary wagering game thereon, at least one community display for displaying at least a portion of a community event thereon; and at least one controller in communication with the at least one community display and the plurality of gaming machines, the controller being operative to, (i) select one or more gaming machines from the plurality of gaming machines to participate in the community event;

(ii) display a plurality of groups of one or more non-numerical award icons representing communal awards during the community event;

(iii) change the award icons during play of at least one of the primary wagering game and the community event;

(iv) assign a group selected from the plurality of groups to each participating gaming machine;

(v) display a plurality of different non-numerical graphical indicators representing bonus-game enhancements, the graphical indicators being visually related and assigned to respective ones of the award icons;

(vi) assign a graphical indicator selected from the graphical indicators to each participating gaming machine;

(vii) visually change an appearance of the graphical indicator based on play of the primary wagering game at the assigned gaming machine so as to represent a change in value of the bonus-game enhancement represented by the graphical indicator; and (viii) provide a community event award to each participating gaming machine based on the group and the graphical indicator assigned to the participating gaming machine, the community event award being enhanced if one or more of the one or more award icons in the group are assigned the graphical indicator.

2. The gaming system of claim 1, wherein the at least one controller provides a pictorial representation of the community-event awards on the at least one community display.

3. The gaming system of claim 2, wherein the pictorial representation comprises at least one themed scene.

4. The gaming system of claim 3, wherein the at least one community display is remote from the selected one or more gaming machines.

5. The gaming system of claim 1, wherein the bonus-game enhancement is a bonus-game multiplier.

6. The gaming system of claim 1, wherein each one of the plurality of groups is represented by a respective region of the community display.

7. The gaming system of claim 1, wherein the graphical indicator is selected by each of the plurality of gaming machines.

8. The gaming system of claim 5, wherein the graphical indicator is visually constructed as the bonus-game multiplier is increased.

9. The gaming system of claim 1, wherein the controller is operative to change the award icons by changing at least one of a location, a quantity, a value, and a type of the award icons.

10. The gaming system of claim 1, wherein each one of the plurality of groups is represented by a respective distinct region of the community display, the controller being further operative to visually change the size of the region.

11. A method for conducting a communal wagering game on a plurality of gaming machines comprising the steps of:

providing at least one display device for displaying at least a portion of a community event thereon;

selecting, by at least one of one or more processors, two or more gaming machines from the plurality of gaming machines to participate in the community event;

displaying at least one primary wagering game on at least a display device of one or more of the plurality of gaming machines;

displaying, on the at least one display device, a plurality of groups of one or more non-numerical award icons representing communal awards during the community event;

changing, by at least one of the one or more processors, the award icons during play of at least one of the primary wagering game and the community event;

assigning, by at least one of the one or more processors, a group selected from the plurality of groups to each participating gaming machine;

displaying, on the at least one display device, a plurality of different non-numerical graphical indicators representing bonus-game enhancements, the graphical indicators being visually related and assigned to respective ones of the award icons;

assigning, by at least one of the one or more processors, a graphical indicator selected from the graphical indicators to each participating gaming machine;

visually changing, by at least one of the one or more processors, an appearance of the graphical indicator based on play of the primary wagering game at the assigned gaming machine so as to represent a change in value of the bonus-game enhancement represented by the graphical indicator; and providing, by at least one of the one or more processors, a community event award to each participating gaming machine based on the group and the graphical indicator assigned to the participating gaming machine, the community event award being enhanced if one or more of the one or more award icons in the group are assigned the graphical indicator.

12. The method of claim 11, wherein the bonus-game enhancement is a bonus-game multiplier, the visually changing of the appearance of the graphical indicator includes constructing the graphical indicator proportional to the bonus-game multiplier being increased.

13. The method of claim 12, further comprising providing a pictorial representation of the community-event award on the at least one display device.

14. The method of claim 13, further comprising, providing at least one action icon randomly traversing the at least one display device for modifying the community-event awards.

15. The method of claim 11, further comprising representing, by at least one of the one or more processors, each one of the plurality of groups as a corresponding region of the at least one display device.

16. The method of claim 11, wherein changing the award icons includes changing at least one of a location, a quantity, a value, and a type of the award icons.

17. The method of claim 11, further comprising:

representing, by at least one of the one or more processors, each one of the plurality of groups as a respective distinct region of the at least one display device; and visually changing, by at least one of the one or more processors, the size of the region.

18. One or more non-transitory machine-readable storage media including instructions which, when executed by one or more processors, cause the one or more processors to perform operations comprising:

providing at least one display device for displaying at least a portion of a community event thereon;

selecting two or more gaming machines from the plurality of gaming machines to participate in the community event;

displaying at least one primary wagering game on at least a display device of one or more of the plurality of gaming machines;

displaying on the at least one display device a plurality of groups of one or more non-numerical award icons representing communal awards during the community event;

changing the award icons during play of at least one of the primary wagering game and the community event;

assigning a group selected from the plurality of groups to each participating gaming machine;

displaying on the at least one display device a plurality of different non-numerical graphical indicators representing bonus-game enhancements, the graphical indicators being visually related and assigned to respective ones of the award icons;

assigning a graphical indicator selected from the graphical indicators to each participating gaming machine;

visually changing an appearance of the graphical indicator based on play of the primary wagering game at the assigned gaming machine so as to represent a change in value of the bonus-game enhancement represented by the graphical indicator; and providing a community event award to each participating gaming machine based on the group and the graphical indicator assigned to the participating gaming machine, the community event award being enhanced if one or more of the one or more award icons in the group are assigned the graphical indicator.

19. The non-transitory machine-readable storage media of claim 18, wherein changing the award icons includes changing at least one of a location, a quantity, a value, and a type of the award icons.

20. The non-transitory machine-readable storage media of claim 18, the operations further comprising representing each one of the plurality of groups as a respective distinct region of the at least one display device.

21. The non-transitory machine-readable storage media of claim 18, the operations further comprising:

representing each one of the plurality of groups as a respective distinct region of the at least one display device; and visually changing the size of the region.

* * * * *